(12) United States Patent
Jester

(10) Patent No.: US 11,564,019 B2
(45) Date of Patent: Jan. 24, 2023

(54) VEHICLE AUXILIARY WIRELESS PERSONAL AREA NETWORK SYSTEM

(71) Applicant: Panasonic Avionics Corporation, Lake Forest, CA (US)

(72) Inventor: Samuel Jester, Lake Forest, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 406 days.

(21) Appl. No.: 16/869,746

(22) Filed: May 8, 2020

(65) Prior Publication Data

US 2021/0352384 A1 Nov. 11, 2021

(51) Int. Cl.
| | |
|---|---|
| *H04Q 9/00* | (2006.01) |
| *H04W 4/42* | (2018.01) |
| *G06F 1/26* | (2006.01) |
| *H04L 9/40* | (2022.01) |
| *H04W 12/121* | (2021.01) |
| *H02J 50/00* | (2016.01) |
| *H04W 84/12* | (2009.01) |

(52) U.S. Cl.
CPC ................. *H04Q 9/00* (2013.01); *G06F 1/26* (2013.01); *H04L 63/1416* (2013.01); *H04W 4/42* (2018.02); *H04W 12/121* (2021.01); *H02J 50/001* (2020.01); *H04Q 2209/43* (2013.01); *H04Q 2209/886* (2013.01); *H04W 84/12* (2013.01)

(58) Field of Classification Search
CPC .......... G06F 9/451; B60L 8/003; B64D 45/00; H04L 12/40; H04L 29/06; H04W 84/02; H04Q 9/00
See application file for complete search history.

(56) References Cited

U.S. PATENT DOCUMENTS

| | | | |
|---|---|---|---|
| 9,516,352 B2 | 12/2016 | Keen et al. | |
| 9,678,488 B1* | 6/2017 | Dhondt | ..................... B64F 5/60 |
| 10,315,770 B2 | 6/2019 | Udriste et al. | |
| 2015/0363981 A1* | 12/2015 | Ziarno | ............... H04B 7/18506 |
| | | | 701/1 |
| 2016/0200455 A1 | 7/2016 | Gadgil et al. | |
| 2018/0234825 A1 | 8/2018 | Rochau et al. | |
| 2018/0281990 A1 | 10/2018 | Fagan et al. | |
| 2019/0187978 A1* | 6/2019 | Leibham | ............. G06F 11/1433 |
| 2019/0256227 A1 | 8/2019 | Balasubramanian et al. | |

* cited by examiner

*Primary Examiner* — Iqbal Zaidi
(74) *Attorney, Agent, or Firm* — Perkins Coie LLP

(57) ABSTRACT

An auxiliary wireless personal area network system installable in a vehicle includes a plurality of line replaceable units each associated with an avionics subsystem and installable in prescribed locations in the aircraft. At least a subset of the line replaceable units are interconnectable over a dedicated subsystem network. A plurality of network node devices are each associated with a respective one of the plurality of line replaceable units. Each of the network node devices has a microcontroller, an onboard power source independent of any aircraft power source, a local interface connectible the corresponding one of the plurality of line replaceable units, and a wireless network interface connectible to a personal area network independent of the dedicated subsystem network for relaying operational data from the line replaceable unit to the network node device.

15 Claims, 7 Drawing Sheets

VEHICLE AUXILIARY WIRELESS PERSONAL AREA NETWORK SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to avionics, and more particularly to an onboard auxiliary wireless personal area network system for communicating with various line replaceable units (LRUs) installed throughout the cabin of the aircraft.

2. Related Art

Modern passenger aircraft employ different avionics system for practically every facet of operation. There are flight control systems that electromechanically actuate the flight control surfaces to manipulate the dynamics of an aircraft in flight. There are engine and fuel delivery systems that are also electrically controlled. Accurate and precise aircraft control requires constant feedback of data, including such basic operational information as altitude, airspeed, heading, and attitude, and the more particular forms thereof including ground speed, pitch and roll attitude, and lateral, longitudinal, and vertical acceleration. These parameters are measured by various sensors in the aircraft and presented on instruments in the flight deck. Status information regarding the operation of the various aircraft subsystems as well as the flight in general such as Weight on Wheels may also be recorded.

In addition to these foundational components, aircraft may be equipped with several advanced avionics systems that enhance flight operations. These include navigation systems such as satellite or Global Positioning System (GPS) modules and ground-based radio systems that report aircraft position and heading. The position information may be presented in the context of area terrain/moving maps, traffic, and weather data for manual guidance, or passed to flight control systems for automated route guidance. Along these lines, there may also be onboard radar and ground-based broadcast weather systems, collision avoidance systems (e.g., traffic alert and collision avoidance system, terrain awareness warning system, etc.), and fuel management systems that make fuel calculations needed for in-flight decisions about potential routing, fuel stops, and diversions. Communications within the aircraft between flight crew, cabin crew, and passengers are critical to coordinate flight operations and ensure safety, so there may be various intercom and public address (PA) systems installed on aircraft. Communications from the flight deck to ground is also necessary, and thus there may be radio transceiver modules operating in the aircraft band installed onboard the aircraft.

Avionics are not limited to those systems utilized by crewmembers as described above and may encompass those with a more passenger-centric focus. Air travel typically involves journeys over extended distances that at the very least take several hours to complete. Some of the longer non-stop international routes have a scheduled duration of over sixteen hours to fly over ten thousand miles. Passengers on board the aircraft are confined within an enclosed space of a designated seat for the entire duration of the flight, with only a few limited opportunities to leave the seat for use of the lavatory, brief exercise/movement, and the like. To enhance the flying experience, airlines may equip the aircraft with an onboard in-flight entertainment and communications (IFEC) system that offer a wide variety of multimedia content for passenger enjoyment, Internet access via satellite, and so forth. Each passenger seat may have a display screen, an audio output jack, a remote controller, and a computer terminal with networking capabilities that connect to a head-end server from which content can be retrieved or through which Internet traffic to a satellite uplink may be routed.

Because commercial passenger aircraft are expensive, the economics of the operating airlines require minimal downtime for preventive/predictive and reactive maintenance. The various avionics systems mentioned above are comprised of multiple subparts, each with its own maintenance and/or replacement schedule and failure rate. To facilitate troubleshooting and repairs so that an aircraft can commence flight operations expeditiously, such subparts may be modularized into individual line replaceable units (LRUs). Fault conditions can be broadly identified by LRU and replaced with another working LRU in the inventory without a pinpoint identification of a problem part. Routine maintenance may likewise be a simple matter of replacing one LRU for another refreshed LRU.

Within a given avionics system, the various LRUs thereof may be arranged or connected in accordance with its defined hierarchy. Data pertaining to the operational status of each of the LRUs within a given avionics system may therefore be transferred over the communications infrastructure specific thereto. For instance, each of the seatback IFEC terminals may be connected to the head-end server over a wired Ethernet network, with log data pertaining to the terminal being communicated therethrough. Maintenance personnel may then retrieve the log data from the head-end server. A high volume of information regarding the operation of the terminal may be recorded on the server, but this is because of the better data processing capabilities of the terminal. There are other avionics systems in which the individual LRUs have little or no data processing capabilities to execute software that generates useful diagnostic data, or network interfaces over which data can be transmitted to a central server. Some LRUs incorporate built-in test equipment (BITE) that show diagnostic information on an output on the LRU. Even where the avionics system is implemented with data communications modalities, there may be instances in which those fail and is unable to relay the fault information to the central server.

Accordingly, it would be desirable to interconnect the LRUs of various avionics systems installed on an aircraft without additional wired power and data transmission requirements. There is a need in the art for a low cost and low footprint wireless personal area network system with autonomous self-powered nodes that cooperate with the LRUs to report aircraft data, aircraft status information, and BITE data.

BRIEF SUMMARY

The present disclosure contemplates the use of a low power consumption, low hardware footprint wireless local area network or a wireless personal area network that may be integrated into various line replaceable units (LRUs), though separate from the main functions thereof. A wireless connection is established between multiple nodes of the wireless personal area network in order to exchange a variety of data including flight or aircraft status, aircraft information, built-in test equipment data, as well as simple commands such as to reboot the LRU or reconfigure the same. Numerous nodes are contemplated to join the wireless personal area network, so a networking standard such as Zigbee or Bluetooth Low Energy that can accommodate such applications may be selected. The network may be arranged in accordance with a cluster, a mesh, or a star network topology. The node devices may be configured for minimal power consumption in order to operate for several years autonomously via a limited power source such as a lithium ion coin battery.

In one embodiment of the present disclosure, there may be an auxiliary wireless personal area network system installable in an aircraft. The system may include a plurality of line replaceable units each associated with an avionics subsystem. The line replaceable units may also be installable in prescribed locations in the aircraft. At least a subset of the line replaceable units may be interconnectable over a dedicated subsystem network. The system may also include a plurality of network node devices. Each of the network node devices may be associated with a respective one of the plurality of line replaceable units. Furthermore, each of the network node devices may include a microcontroller, an onboard power source independent of any aircraft power source, a local interface connectible the corresponding one of the plurality of line replaceable units, and a wireless network interface connectible to a personal area network independent of the dedicated subsystem network. This may be for relaying operational data from the line replaceable unit to the network node device.

Another embodiment of the present disclosure includes a wireless personal area network system for a vehicle. The system may include a plurality of input devices deployed to prescribed locations in the vehicle. Additionally, the input devices may be receptive to external inputs. The system may also include a plurality of network node devices. Each of the network node devices may be associated with a specific one of the plurality of input devices. Moreover, each of the network node devices may include at least a microcontroller and an input data port that is connectible to the specific one of the plurality of input devices to retrieve operational data therefrom. Each of the network node devices may include a network transceiver that is connectible to an auxiliary personal area network. The operational data retrieved from the specific one of the plurality of input devices may be transmitted to other network node devices connected to the auxiliary personal area network. The system may also include a power source that powers at least the microcontroller and the network transceiver independent of power systems of the vehicle.

Yet another embodiment of the present disclosure may be an intrusion detection system for in-vehicle data traffic transmissions. The system may include a data traffic interface that is receptive to at least one of the in-vehicle data traffic transmissions. The system may also have an intrusion detector that is connected to the data traffic interface. Specific ones of the in-vehicle data traffic transmissions and originating devices thereof may be identified as security threats based upon an evaluation of the in-vehicle data traffic transmissions. There may be a network transceiver that is connectible to an auxiliary personal area network. The in-vehicle traffic transmissions identified as security threats may be transmitted as a security event to a gateway device over the auxiliary personal area network. The system may further include a power source that powers at least the microcontroller and the network transceiver independent of power systems of the vehicle.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
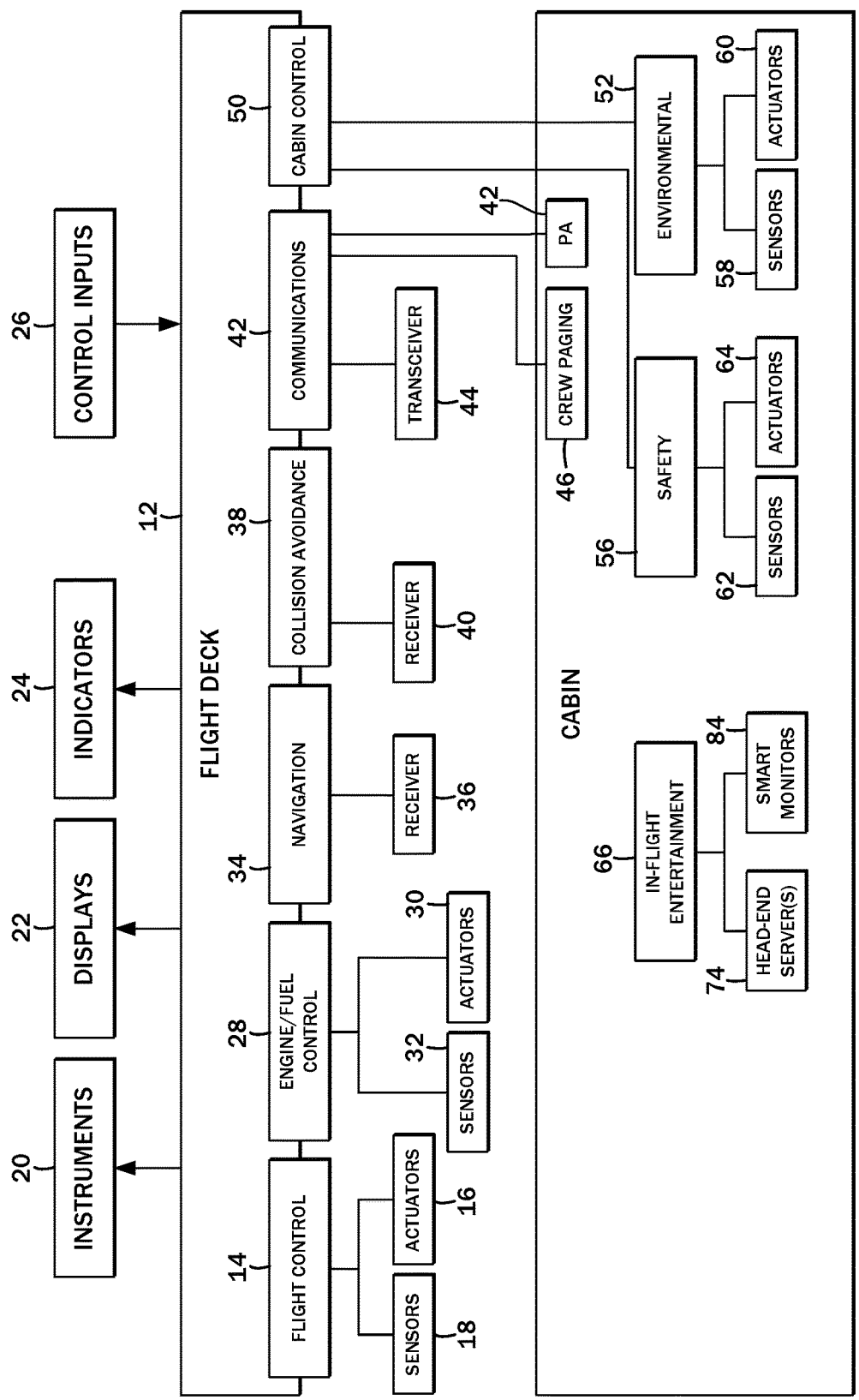
FIG. 1 is a block diagram illustrating exemplary avionics systems typically installed in a passenger aircraft.

The detailed description set forth below in connection with the appended drawings is intended as a description of the several presently contemplated embodiments of an auxiliary wireless personal area network system and is not intended to represent the only form in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

The present disclosure contemplates an auxiliary data communications network that is separate and operates independently of data communications modalities utilized by various avionics systems. With reference to the block diagram of FIG. 1, an aircraft 10 may incorporate multiple avionics systems that are utilized by a flight crew to operate and monitor the aircraft 10. Although the features of the present disclosure will be described in the context of the aircraft 10, this is by way of example only and not of limitation. The presently disclosed embodiments may be applicable to other contexts as appropriate, such as, by way of non-limiting illustrative example, busses, trains, ships, and other types of vehicles.

The aircraft 10 may have a flight control system 14 that manipulates and reports on the dynamics of the aircraft 10 in flight. Various actuators 16 that control the physical movement of the ailerons to control the roll dynamic, elevators to control the pitch dynamic, and rudder to control the yaw dynamic, as well as secondary control surfaces such as flaps, spoilers, and trim tabs are understood to be part of the flight control system 14.

Aircraft operational information such as altitude, airspeed, attitude, and so on are measured by various sensors 18 installed throughout the aircraft 10 and may also be deemed to be part of the flight control system 14. The parameters captured by the sensors 18 may be shown on different instruments 20 such as dedicated altimeters, gyroscopes, and the like, as well as more sophisticated displays 22 that combine the captured parameters and presents an aggregated view of the information in a more easily comprehended format. At the other end of complexity are indicators 24 that may be illuminated to represent certain conditions of the aircraft 10 or any of its avionics systems. The flight control system 14 is understood to have its own set of indicators 24 specific thereto.

The actuators 16 of the flight control system 14 that manipulate the aircraft control surfaces may be driven in response to inputs provided through control inputs 26. This may include yokes, pedals, and/or control sticks that accept multi-axis inputs, which are then translated to corresponding activations of the actuators 16. The control inputs 26 include switches, buttons, or any other device that accepts a physical input from a pilot that commands one or more operational aspects of the avionics systems onboard the aircraft 10.

Beyond the aforementioned flight dynamics and the flight control system 14 that manipulates the same, forward thrust of the aircraft 10 is provided by the engines, and there is understood to be an avionics system specific thereto, generalized in the block diagram of FIG. 1 as an engine/fuel control system 28. Like the other avionics systems, there may be a set of actuators 30 that control the operation of the engine, fuel delivery pumps, and so forth, along with a set of sensors 32 that report back the operational parameters of the engine and fuel delivery system such as engine speed, coolant pressure and temperature, and so forth. The control inputs 26 that regulate fuel delivery and engine output thrust include a throttle control knobs, air/fuel mixture control knobs, and ignition switch, among others.

The aircraft 10 may include other avionics systems that enhance flight safety and convenience. There may be a navigation system 34 that reports aircraft position and heading. This may be based upon coordinates received via a Global Positioning System (GPS) satellite, or ground-based radio modalities such as Automatic Direction Finder (ADF), radar, VHF Omnidirectional Range (VOR), and so forth. Each of these systems may include a specific receiver 36 therefor. The current location of the aircraft may be shown on a moving map, with various overlays such as nearby traffic, weather, etc. Additionally, there may be a collision avoidance system 38, which is understood to include the traffic alert and collision avoidance system (TACAS) and the terrain awareness warning system (TAWS). As will be recognized by those having ordinary skill in the art, TACAS relies on transponder signals from nearby aircraft, and therefore includes a receiver 40. TAWS, however, is understood to utilize altitude values from the instruments 20 and compares those to known terrain information.

The aircraft 10 is also equipped with various modalities for the flight crew to communicate with the cabin crew, passengers, and ground operations. To this end, there is a communications system 42 with at least a transceiver 44 that operates on the VHF aircraft band. Additionally, there may be a crewmember paging system 46, as well as a cabin public announcement (PA) system 48.

From the flight deck 12, various subsystems pertaining to the cabin may be controlled. These may be collectively referred to as a cabin control system 50 and may interoperate with an environmental control system 52 and a safety system 56, among others. In general, the environmental control system 52 allows the flight and/or cabin crew to adjust the temperature, pressure, ventilation, and/or humidity of the cabin. The set values for each of these environmental conditions may be maintained by a control loop system with multiple sensors 58 and actuators 60 to increase or decrease airflow, increase or decrease the temperature of such airflow, and so on. Along these lines, the safety system 56 may likewise have sensors 62 and actuators 64 to detect potentially harmful environmental conditions and provide relief therefor to the passengers. The safety system 56 may also include warning lights such as fasten seatbelt signs, cabin evacuation lights, and the like.

Separated from the flight deck 12 is an in-flight entertainment and communications (IFEC) system 66, through which various entertainment and connectivity services may be provided to passengers while onboard. The auxiliary personal area network system may be utilized in connection with any of the above-identified avionics subsystems such as the flight control system 14, the engine/fuel control system 28, and so on, but the illustrative embodiments are described in the context of the in-flight entertainment and communications system 66. As such, reference will be made to specific features thereof, and a brief overview of an exemplary in-flight entertainment and communications system 66 follows. It will be appreciated, however, that the auxiliary personal area network system may be adapted to other avionics systems, with suitable modifications to utilize the same in such alternative contexts being within the purview of those having ordinary skill in the art. Furthermore, the foregoing description of the various avionics system, the illustrated arrangement, inter-relationships, and connections between the different parts is a simplified and exemplary overview. Different aircraft may utilize a different arrangement or configuration, and the system is not limited to the specifics disclosed. The example of FIG. 1 merely illustrates that there are multiple avionics systems performing specific functions, and how each system may be comprised of multiple components or line replaceable units (LRUs) with which certain components of the auxiliary personal area network system may be utilized.

Figure 2:
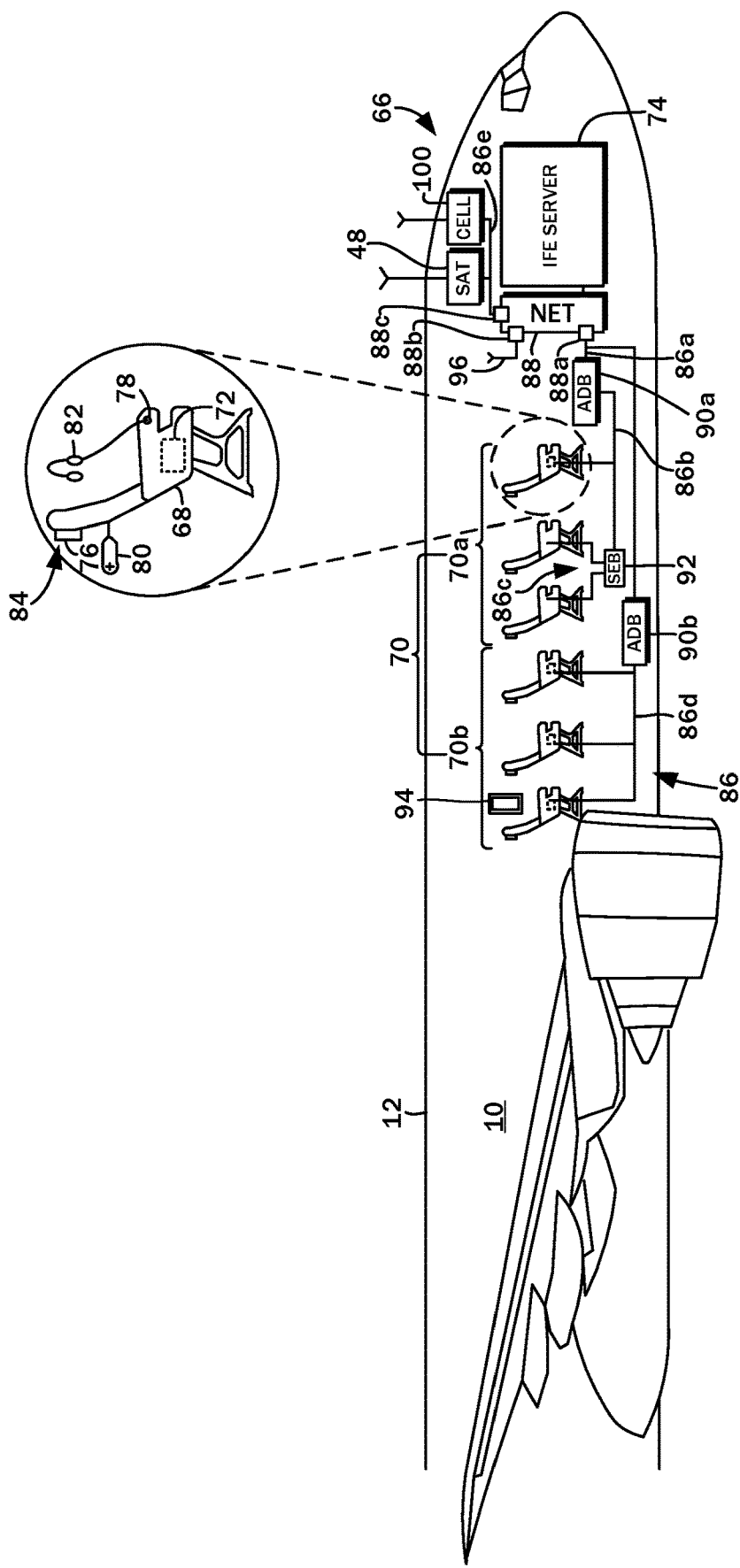
FIG. 2 a diagram illustrating an exemplary aircraft in which an embodiment of the auxiliary personal area network system may be implemented.

With reference to the simplified diagram of the aircraft 10 shown in FIG. 2, within a fuselage 67 thereof, there may be seats 68 arranged over multiple rows 70, with each seat 68 accommodating a single passenger. When referenced generally, the IFEC system 66 is understood to encompass terminal devices 72 installed for each seat 68, as well as the IFEC server 74 and the other components involved in the delivery of the entertainment and communications functionality. In the illustrated example, this includes a display 76, an audio output 78, and a remote controller or handset 80. For a given row 70 of seats 68, the terminal device 72 and the audio output 78 are disposed on the seat 68 for which it is provided, but the display 76 and the handset 80 may be located on the row 70 in front of the seat 68 to which it is provided. That is, the display 76 and the handset 80 may be installed on the seatback of the row in front of the seat. Other display 76 and handset 80 mounting and access configurations such as a retractable arm or the like mounted to an armrest of the seat 68 or by mounting on a bulkhead are also possible.

The display 76 may be a conventional liquid crystal display (LCD) screen or other type with a low profile that is suitable for installation on the seatback. Each passenger can utilize an individual headset 82, supplied by either the airline or by the passenger, which provides a more private listening experience. The audio output 78 may be a headphone jack that is a standard ring/tip/sleeve socket. The headphone jack may be disposed in proximity to the display 76 or on the armrest of the seat 68 as shown. The headphone jack may be an active type with noise canceling and including two or three sockets or a standard audio output without noise canceling. Each display 76 may incorporate the aforementioned terminal device 72 to form a unit referred to in the art as a smart monitor 84.

One use for the smart monitor 84 installed on the aircraft 10 is the playback of various multimedia content. The smart monitor 84 may be implemented with a general-purpose data processor that decodes the data files corresponding to the media content and generates video and audio signals for the display 76 and the audio output 78, respectively. The media content data files may be streamed to specific terminal devices 72 upon request. The content may be encrypted, so the digital rights management functionality to enable streaming/playback may be performed by the IFEC server 74. Functionality not pertaining to the delivery of media content, such as relaying imagery from external aircraft cameras, flight path/mapping information, and the like may also be performed by the IFEC server 74. Although only a single IFEC server 74 is shown in FIG. 2, there may be additional IFEC servers, also referred to as head-ends, sharing the processing load. It is also possible for the media content/storage functions to be performed by the smart monitor 84, among other devices onboard the aircraft 10.

The passenger can play games being executed on the terminal device 72 and otherwise interact with the media content with the handset 80. Navigating through the vast media content library and selecting ones for viewing and/or listening is also possible with the handset 80, though in some different installations, a touch-screen display may be provided for a more intuitive interaction with the media content library. In either case, the terminal device 72 is loaded with a content selection software application that is executed by the data processor and accepts input from the handset 80 or other input modality and generates a response on the graphical interface presented on the display 76.

Each of the terminal devices 72/smart monitors 84 for the seats 68 may be connected to the IFEC server 74 as well as any or any other server that is part of the IFEC system 66 over a local area network 86, one segment of which may preferably be Ethernet. The IFEC system 66 thus also includes a data communications module 88, and more specifically, an Ethernet data communications module 88a, e.g., an Ethernet switch or router. In a typical aircraft installation, the data communications module 88 may be a separate line replaceable unit (LRU) and may also be referred to as a network controller (NC). Likewise, the IFEC server 74 and the other servers onboard the aircraft 10 may be standalone computer systems with one or more general purpose data processors, memory, secondary storage, and a network interface device for connecting to the local area network 86. The computer systems may have an operating system installed thereon, along with server applications (e.g., web servers, streaming servers, and so forth) providing various in-flight entertainment/communications services in cooperation with the terminal devices 72 connected thereto.

The local area network 86 may be logically separated into tiered segments, with the network controller/data communications module 88 being at the top of the hierarchy or central to all of the segments. The smart monitors 84 may be organized according to sections, rows, or columns of seats 68, and the local area network 86 may be structured accordingly.

There may be a first area distribution box (ADB) 90a, which may also be a line replaceable unit that is directly connected to the network controller/data communications module 88 and establishes a first network segment 86a of the local area network 86 for a first set of rows 70a. Connected to the first ADB 90a over a downstream second network segment 86b may be the smart monitors 84. The speed of the second network segment 86b may be slower than the upstream first network segment 86a. In some implementations, there may be an additional seat electronic box (SEB) 92 that handles some data processing operations shared amongst multiple smart monitors. The further downstream network segment 86c may, in turn, be shared with the peripheral devices connected to the smart monitor such as a payment terminal, a USB port, and the like.

A second ADB 90b is also directly connected to the network controller/data communications module 88 and is also part of the same first network segment 86a. The second ADB 90b may be dedicated for the second set of rows 70b, with individual connections to each of the smart monitors 84 or terminal devices 72 defining a fourth network segment 86d. Although different network segmentation hierarchies are illustrated, for example, one set of seats 68 being connected to an SEB 92, which in turn is connected to the ADB 90a, along with a direct connection between the smart monitor 84 or terminal device 72 to the ADB 90b, a typical aircraft configuration will be consistently structured.

Passengers and cabin crew alike may utilize a portable electronic device (PED) 94 during flight. PEDs 94 are understood to refer to smart phones, tablet computers, laptop computers, and other like devices that include a general-purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

Conventional PEDs 94 incorporate a WLAN (WiFi) module, so the data communications module 88 of the IFEC system 66 includes a WLAN access point 96 that is connected over a wireless network interface 88b. The PED 94, via the onboard WLAN network, may connect to the IFEC system 66 to access various services offered thereon such as content downloading/viewing, shopping, and so forth. The local area network interface or data communications module 88 encompasses the hardware components such as the WLAN transceiver, antennas, and related circuitry, the Ethernet router/switch, as well as the software drivers that interface the hardware components to the other software modules of the IFEC system 66.

The IFEC system 66, including each of its constituent components, as well as the other avionics systems and the PEDs 94 onboard the aircraft 10 may communicate with ground-based network nodes via a variety of communications modalities. The network controller/data communications module 88 thus includes a remote module 88c that is connected to, for example, a satellite module 98, which establishes an uplink to a communications satellite. This uplink may be Ku-band microwave transmission modality, though any suitable modality such as Inmarsat or Iridium may also be utilized. Due to the high costs, carriers may limit data traffic to and from the satellite module 98 with a firewall or network access controller.

Alternatively, or additionally, the IFEC system 66 may incorporate a cellular modem 100 for remote connectivity, which similarly establishes a communications link via terrestrial cellular sites. This remote connectivity modality is understood to be primarily utilized while the aircraft 10 is on the ground and utilizes a cellular communications provider that offers a network gateway that routes data traffic from the cellular modem 100 to a wide area network. The cellular modem 100 may serve as a backup to the extent a local airport based WiFi network is unavailable.

The satellite module 98 and the cellular modem 100 may be on still a different part of the local area network 86, e.g., a fifth network segment 86e. As indicated above, to limit incoming as well as outgoing traffic, this fifth network segment 86e may incorporate a network access controller to paying users, crew members, or other subgroups of those accessing the local area network 86 onboard the aircraft 10.

The foregoing arrangement of the IFEC system 66 along with its constituent components have been presented by way of example only and not of limitation. Other aircraft 10 may have any number of different configurations, and may incorporate components that were not mentioned above, or functions may be handled by a different subpart or component than that to which above description attributes. Along these lines, features described above may be omitted from such different configurations.

Figure 3:
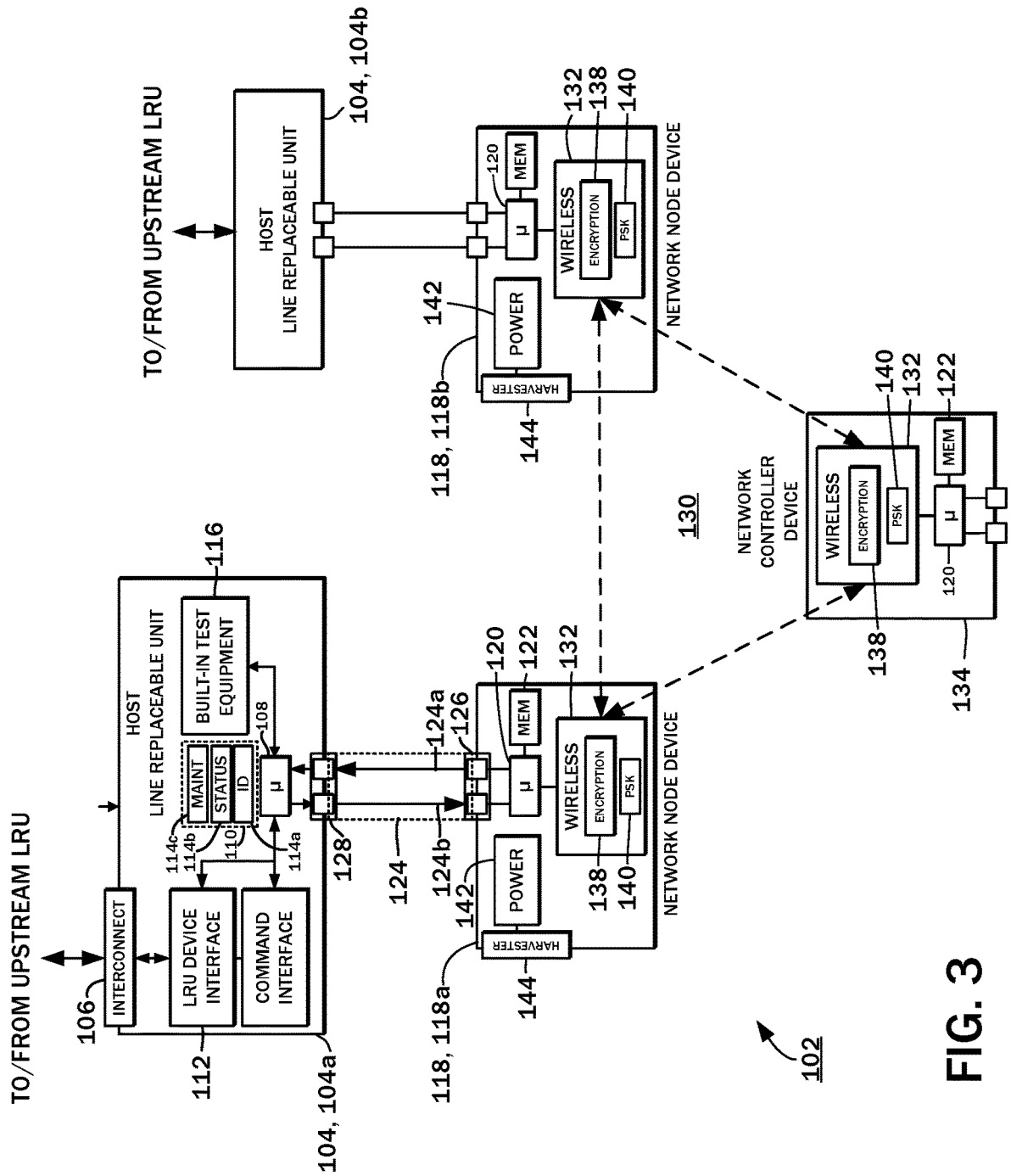
FIG. 3 is a block diagram of an auxiliary personal area network system according to an embodiment of the present disclosure.

Referring now to the block diagram of FIG. 3, an embodiment of the present disclosure contemplates an auxiliary personal area network system 102 that is configured in the aircraft 10. The system 102 includes a plurality of line replaceable units (LRUs) 104, each of which may be associated with an avionics subsystem as discussed above. In the context of the IFEC system 66, one LRU 104a may be a first smart monitor 84 for one seat 68, and another LRU 104b may be a second smart monitor 84 for another seat 68. Alternatively, the LRU 104 may be the area distribution box 90, the seat electronic box 92, the IFEC server 74, or any other component that is encompassed within the IFEC system 66. In some instances, such as with the LRU 104a, another LRU may be interconnected thereto over a dedicated subsystem network. For example, if the LRU 104a is the smart monitor 84, it may be connected to the IFEC server 74 over the aforementioned local area network 86. The LRU 104a is understood to have an interconnect interface 106, which in this case would be an Ethernet network interface card. Again, a variety of LRUs 104 may be installed within the aircraft 10, so the upstream connections and data transfer protocols used by the avionics systems and the interconnect interfaces 106 therefor may also vary.

The LRU 104 may include a microcontroller 108 that may execute pre-programmed, computer-readable instructions that are stored in a memory 110 and implement the functionality of the LRU 104. In the example of the LRU 104 that is the smart monitor 84, the software may perform the menu selection and multimedia content streaming applications among others. As referenced herein, a microcontroller is understood to refer generally to any data processing apparatus that accepts inputs, executes instructions, and generates outputs in response to the execution of the instructions. It is intended to encompass other processors that are not necessarily microcontrollers in the narrowest sense, including application-specific integrated circuits (ASICs), field programmable gate arrays (FPGAs), and the like. The LRU 104 implements its own device interface 112, which again for the smart monitor 84, may be the touch display screen. The memory 110 also stores information about the LRU 104, such as, for example, a device identifier 114a, an operational status indicator 114b, and a maintenance status indicator 114c. The LRU 104 may also include built-in test equipment (BITE) 116 which provides fault management and self-diagnostic functions.

The embodiments of the present disclosure additionally contemplate a network node device 118 that is connectible to the LRU 104 and associated therewith. Like the LRU 104, the network node device 118 includes a microcontroller 120 that executes pre-programmed, computer-readable instructions stored in a memory 122. As shown in the block diagram of FIG. 3, the first network node device 118a is communicating with the first LRU 104a over a direct communications link 124 comprised of an outgoing connection 124a and an incoming connection 124b. The network node device 118 thus includes a communications port 126, while the LRU 104 has a counterpart communications port 128. The communications port 126 may also be referred to as a local interface. According to one exemplary embodiment, the communications ports 126, 128 are serial input/output ports such as RS-232, RS-422, RS-485, or Universal Serial Bus (USB) though any other suitable communications modality may be utilized without departing from the scope of the present disclosure.

The network node device 118 establishes an auxiliary personal area network 130 with a wireless communications module 132, also referred to as a wireless network interface. The wireless communications module 132 is understood to incorporate a transceiver circuit that receives and transmits radio frequency signals, amplifiers, signal processing integrated circuits, and so on. Those having ordinary skill in the art will recognize the possible variations in the configuration of the wireless communications module 132 and the circuits comprising it, so additional details thereof will be omitted for the sake of brevity. Again, the auxiliary personal area network 130 is separate and independent of the upstream connections established by the interconnect interface 106 to link with other LRUs 104. In one embodiment, the auxiliary personal area network 130 is a low power, low data rate, and close proximity ZigBee mesh network as defined under IEEE 802.15.4, and so the wireless communications module 132 is a ZigBee transceiver module. The operating frequency of the wireless communications modules 132 may be in the 800 MHz to 900 MHz band that is currently open for aircraft use. The second network node device 118b that is directly linked to the second LRU 104b is likewise equipped with the same wireless communications module 132 and may join the auxiliary personal area network 130. Alternatively, Bluetooth Low Energy (BLE) may be utilized. The use of ZigBee or BLE in the embodiments of this disclosure are by way of example only and not of limitation, and any other wireless personal area networking modality with high reliability connections with minimal power requirements capable of establish many-to-many mesh networks may be readily substituted.

A network controller device 134, which may be referred to as a parent node, may also be a part of the auxiliary personal area network 130 and communicates wirelessly with the first network node device 118*a* and/or the second network node device 118*b*. The first network node device 118*a* receives operational information regarding the LRU 104 to which it is connected, such as the aforementioned device identifier 114*a*, operational status indicator 114*b*, and the maintenance status indicator 114*c*. LRU fault conditions, as well as status information from the built-in test equipment 116 may be received.

The data available from the LRU 104 is transmitted to the network node device 118*a* over the direct communications link 124 and transmitted to one or more of the nodes on the auxiliary personal area network 130. The parent node, e.g., the network controller device 134 may receive and store the information for subsequent collection or immediate use in real-time. To this end, the network controller device 134 may likewise include a wireless communications module 132, together with a memory 122 for storing the received information, as well as a microcontroller 120 to manage such functionality. Beyond the information directly retrieved from the LRU 104, other data pertaining to the operation of the aircraft 10, status information such as weight on wheels (WoW) and the like may also be collected and transmitted over the auxiliary personal area network 130. This status data can be aggregated, and a full system status report of all of the LRUs 104 in the aircraft 10 may be generated. The transmission of data from the first LRU 104*a* to the network controller device 134 via the auxiliary personal area network 130 need not be direct, and may be relayed through an intermediary, e.g., the second LRU 104*a*. Additional details of a mesh network configuration will be described below.

The foregoing examples illustrate the transmission of data originating from the LRU 104 over the auxiliary personal area network 130, but it is also possible to transmit data or a command to the LRU 104 from the network node device 118 for execution by the LRU 104. In further detail, the LRU 104 may include a command interface 136 that receives an incoming command from the network node device 118. The command may be to reset or reboot the LRU 104 upon a fault condition being indicated, resetting a network connection, reconfiguring a network interface, and so on. The command interface 136 translates the received command and generates a native action of the LRU 104 via the LRU device interface 112. The commands may originate from the network controller device 134, or any other node on the auxiliary personal area network 130.

In one use case, a fault condition or a misconfiguration that arose in the LRU 104 may be reported by the network node device 118. Acting on this information, the network controller device 134 or other network node device 118 on the auxiliary personal area network 130 may issue a reset command to the malfunctioning LRU 104. This command is understood to be transmitted over the auxiliary personal area network 130 to the network node device 118, and the command is interpreted and executed by the command interface 136 of the LRU. Although the general-purpose serial direct communications link 124 may be utilized for the transmission of the command, it is also possible for the network node device 118 to interact directly with power switches and other simple control modalities of the LRU 104.

Regardless of the direction of the data traffic, security measures are contemplated therefor. In particular, the data traffic may be protected by a security module 138, which encrypts the outgoing data with a pre-shared key 140. Upon receipt by the security module 138 of, for example, the second network node device 118*b*, the pre-shared key 140 thereof is used to decrypt the data. Similarly, when the data is received by the security module 138 of the network controller device 134, the data is decrypted with the pre-shared key 140. If additional security is deemed desirable, the pre-shared key 140 may be used during a commissioning process to install a fleet or aircraft-specific key. Thus, similar but un-commissioned devices may not monitor the data traffic on the auxiliary personal area network 130.

The network node devices 118 are contemplated to be deployed to a variety of LRUs 104 located throughout the aircraft 10, including under the floor, in an electronics bay (Ebay) rack area, etc. As such, the network node devices 118 have an independent power source 142, which in one embodiment is a lithium-ion coin battery with an output voltage of 3V, though this is by way of example only. It is therefore possible to eliminate additional interfaces to the aircraft power bus and minimize installation labor. Because the independent power source 142 has limited capacity, the components of the network node device 118, including the microcontroller 120, the memory 122, and the wireless communications module 132, are selected with optimal power efficiency as an important parameter. It is contemplated for the network node devices 118 to operate on a single power source 142 for years at a time, along the lines as backup/memory retention batteries utilized for BIOS settings in conventional computer systems. The power source 142 may be recharged and the usage duration of the network node device 118 may be further extended with an energy harvester 144 that converts or scavenges ambient conditions into electrical energy. These include mechanical energy in the form of vibrations and air movement, as well as heat and/or light.

The limited availability of power for the network node device 118, in addition to the slower data transfer speeds for the contemplated primary applications may not be currently reconcilable with streaming video on demand and audio applications that have high duty cycle, high data rate requirements. However, to the extent these such and speed limitations are overcome, it may be possible to apply the present disclosure to these secondary applications. The present disclosure envisions separating the LRU/host device functions from the status and fault reporting functions and the transmission of commands to control certain aspects of the LRU 104.

Figure 4:
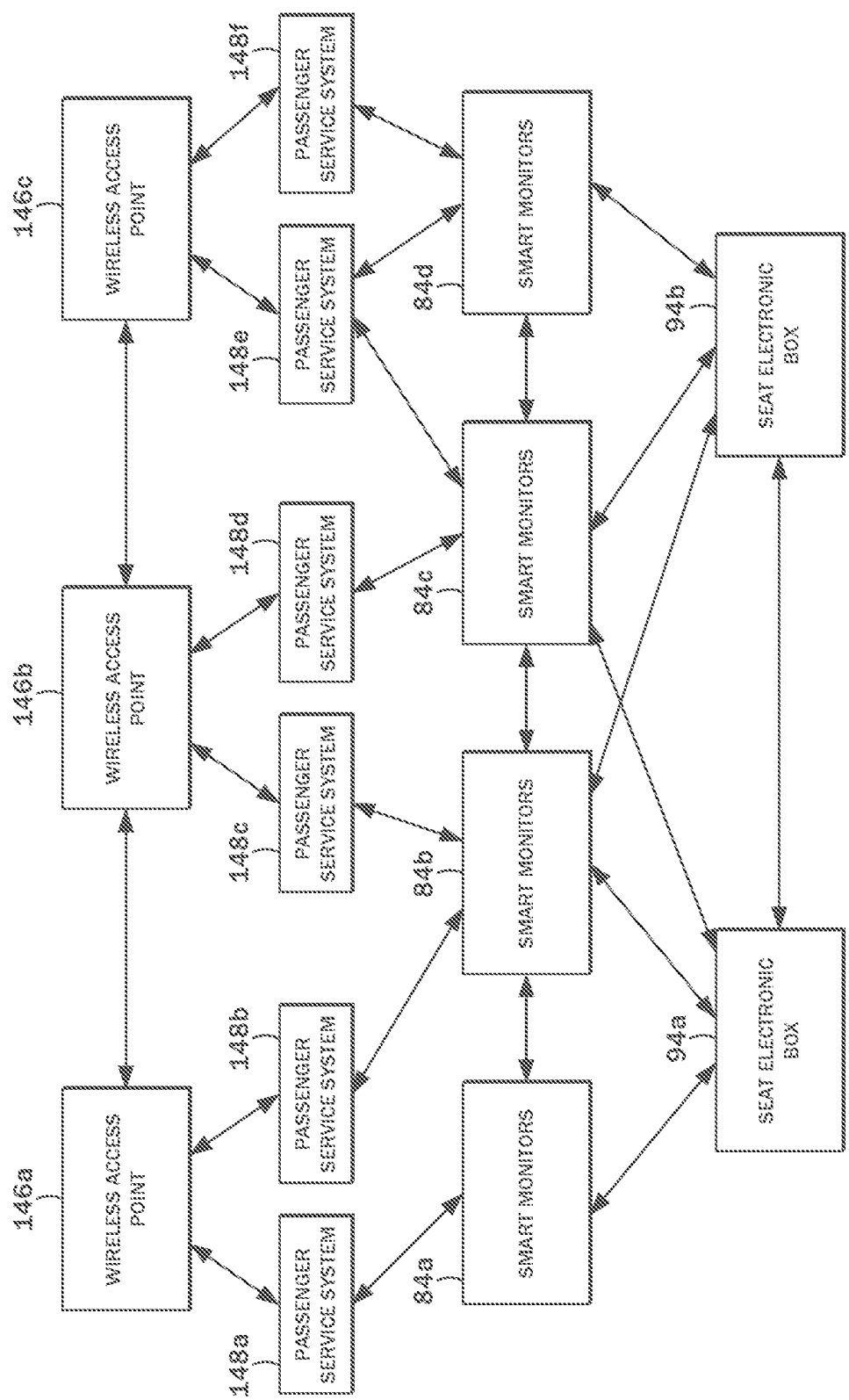
FIG. 4 is a diagram illustrating an example mesh network established by the auxiliary personal area network system.

The auxiliary personal area network system 102 of the present disclosure may be expanded further beyond the three-node configuration shown in FIG. 3 above. With reference to the diagram of FIG. 4, there may be multiple types or tiers of node devices, including wireless access points 146, passenger service system nodes 148, seat monitor nodes 150, and seat electronic box nodes 152. In the heretofore described embodiments the network node device 118 was shown linked to an underlying host LRU 104 and relaying data to/from the same. However, it is possible to integrate the features of the network node device 118 into a functional device and use the auxiliary personal area network 130 to transmit and receive data attendant to performing such functions. For example, the passenger service system nodes 148 may include human interface devices (HIDs) such as keypads, buttons, and directional pads, etc. for interacting with the seat monitor nodes 150. These HIDs may also include flight attendant call buttons, flight attendant call reset buttons, reading light control buttons, audio controls, and so on. The commands generated by activating such HIDs may be transmitted over the auxiliary personal area network 130 and may be either the primary or backup transmission modality to the receiving component.

Figure 5:
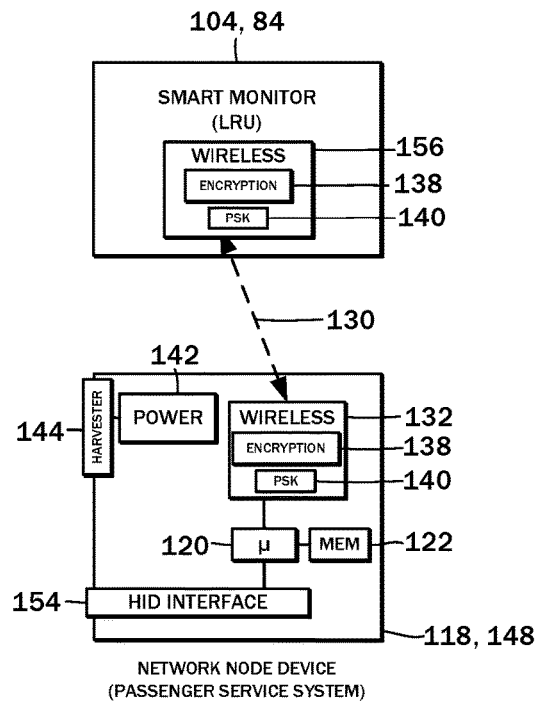
FIG. 5 is a block diagram of one embodiment of the auxiliary personal area network system implemented as a passenger service system controller.

Referring now to the block diagram of FIG. 5, the network node device 118, which is implemented as a passenger service system node 148, includes the same microcontroller 120 and memory 122, as well as the wireless communications module 132. Furthermore, the network node device 118 includes the power source 142 and the energy harvester 144 as in the other embodiments. In this embodiment, however, the network node device 118 includes one or more HID interfaces 154, including the aforementioned keypads, buttons, and the like. The input provided thereto is received and processed by the microcontroller 120 and transmits the same to the smart monitor 84/LRU 104 over the auxiliary personal area network 130. To this end, the smart monitor 84 also includes a wireless communications module 156 that is configured for transmitting to and receiving from the auxiliary personal area network 130.

The transmissions between the network node device 118 and the LRU 104 are understood to be encrypted and decrypted by the security module 138, as are all transmissions to the auxiliary personal area network 130 as discussed above. The pre-shared key 140 used by both the smart monitor 84 and the passenger service system node 148 is understood to be other than the ZigBee default key and is application specific. Such network keys may be installed at the time of production. Carry-on maintenance devices that connect to the auxiliary personal area network 130 to collect fault data from the various LRUs 104 are also understood to have loaded thereon the pre-shared key 140.

Although the network node device 118 is referenced as the passenger service system node 148, this is by way of example only. A similarly configured crewmember handset is also possible. Regardless, a low-cost handset without complicated installation procedures are necessary. This configuration also lowers the risk of failures common to smart monitor handsets connected over physical USB cables. Lost, damaged, or failed devices are more easily replaced because of the lack of a need to disassemble other related components to make the replacement.

With reference again to FIG. 4, the wireless access points 146a-146c establish different segments of the auxiliary personal area network 130 throughout the aircraft 10 for the other network nodes to join, and the passenger service system nodes 148 may connect thereto. The number of passenger service system nodes 148 connecting to a given wireless access point may be limited, e.g., first and second passenger service system nodes 148a and 148b connect to the first wireless access point 146a, third and fourth passenger service system nodes 148c and 148d connect to the second wireless access point 146b, and the fifth and sixth passenger service system nodes 148e and 148f connect to the third wireless access point 146c. The specific passenger service system node 148 that connect to a given one of the wireless access points 146 may depend on the physical location/separation between the two, as only connections meeting certain signal strength thresholds may be maintained. The wireless access points 146 may also be connected in a point-to-point arrangement, with the first wireless access point 146a being connected to the second wireless access point 146b, and the second wireless access point 146b additionally being connected to the third wireless access point 146c.

Multiple passenger service system nodes 148 may connect to a single smart monitor 84, and a single passenger service system node 148 may connect to multiple smart monitors 84. For example, the first passenger service system node 148a may connect solely to the first smart monitor 84a, while the second passenger service system node 148b may additionally connect solely to the second smart monitor 84b. The third passenger service system node 148c may additionally be connected to the second smart monitor 84b. Similarly, the fourth passenger service system node 148d as well as the fifth passenger service system node 148e may both connect to the third smart monitor 84c. The fifth passenger service system node 148e may additionally connect to the third smart monitor 84c and to the fourth smart monitor 84d. Also connected to the fourth smart monitor 84d is the sixth passenger service system node 148f. The smart monitors may 84 be connected in a point-to-point or daisy-chained configuration, with the first smart monitor 84a being connected to the second smart monitor 84b, which in turn is connected to the third smart monitor 84c, which in turn is connected to the fourth smart monitor 84c.

One or more of the smart monitors 84 may also be connected to either one or both of the seat electronic boxes 92, with the first, second, and third smart monitors 84a-84c being connected to the first seat electronic box 92a, and the second, third and fourth smart monitors 84b-84d being connected to the second seat electronic box 92b. The first and second seat electronic boxes 92a, 92b are connected to each other.

The auxiliary personal area network 130 may potentially number hundreds of nodes, and which of the nodes connect to another is understood to vary depending on the connection speed/strength. The foregoing illustrates that multiple connections to the auxiliary personal area network 130 may be established, defining a mesh or clustered arrangement. There may be a central controller like the aforementioned network controller device 134, or control may be decentralized with any one network node device 118 serving as an entry point to initiate an action on any other network node device 118.

The interconnection of multiple avionics systems over the auxiliary personal area network 130 to retrieve built-in test equipment status information from multiple systems may improve troubleshooting prospects. The network node devices 118 may operate autonomously of the host LRU 104, so specific failure points of interdependent components are identifiable. For example, in a conventional configuration, a smart monitor 84 identified as failed may be broadly identified from the lack of a network connection to the IFEC system 66, but the actual cause may be unknown. In accordance with the auxiliary personal area network system 102, even if the LRU 104 loses power, the fault condition may be communicated to other nodes and resolved quickly.

Figure 6:
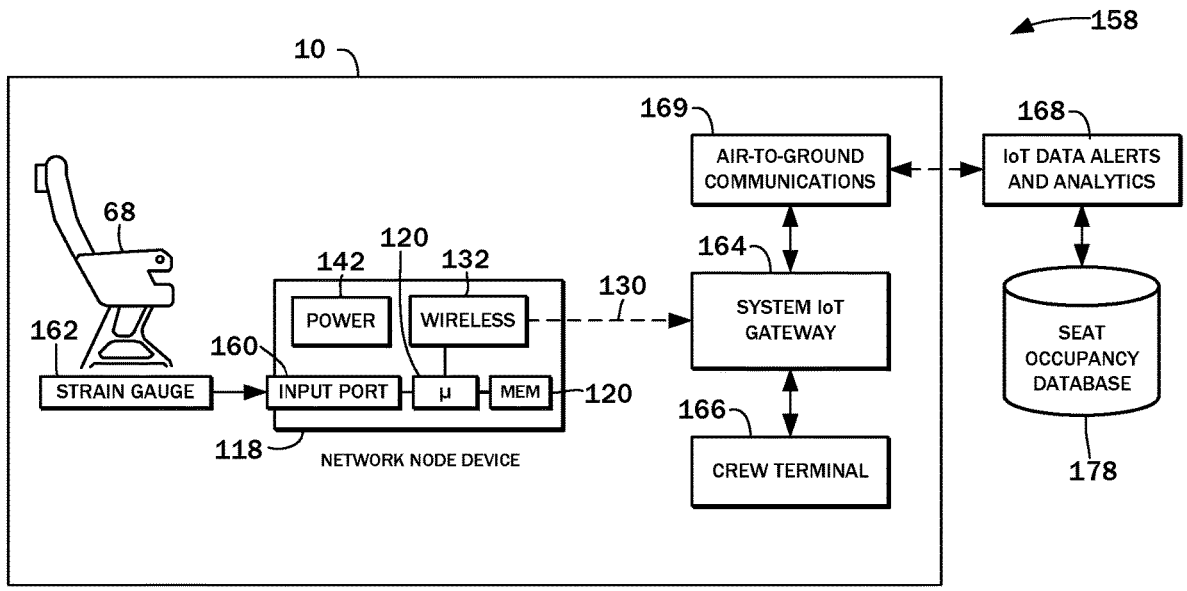
FIG. 6 is a block diagram of an exemplary seat occupancy monitoring application that may be implemented with the auxiliary personal area network system of the present disclosure.

The auxiliary personal area network system 102 of the present disclosure may have many other applications. With reference to the block diagram of FIG. 6, the auxiliary personal area network system 102 may be used for a seat occupancy monitor 158. The network node device 118 configured essentially the same as in the previously described embodiments, including the microcontroller 120, the memory 122, the wireless communications module 132, and the power source 142. Similar to the HID interface 154 described above, there is an input port 160 that is connected to a strain gauge 162 installed on the seat 68. The strain gauge detects whenever a passenger is on the seat 68 and generates a corresponding signal to the network node device 118 via the input port 160. Thus, seat occupancy can be sensed. Furthermore, any movement on the part of the passenger while seated results in corresponding signals from the strain gauge 162, and so it is possible to track the movement of the passenger during different flight phases.

The specific values as measured by the strain gauge 162 may be used to measure passenger weight and forces upon the seat 68 under various flight conditions (e.g., during heavy turbulence, during level cruising flight, etc.). The foregoing configuration may be adapted to other aircraft contexts, including seat belt fastening status, air vent position/orientation/flow status, window shade status, and so on.

The wireless communications module 132 transmits on the auxiliary personal area network 130, ultimately reaching a system IoT gateway 164. The seat occupancy data may then be provided to a crew terminal 166, or to a ground-based analytics processor 168. An air-to-ground communications modality 169 such as the satellite module 98, the cellular modem 100, or a device brought on board between flights to retrieve the data may be used to transmit the occupancy data to the ground-based analytics processor 168.

Figure 7:
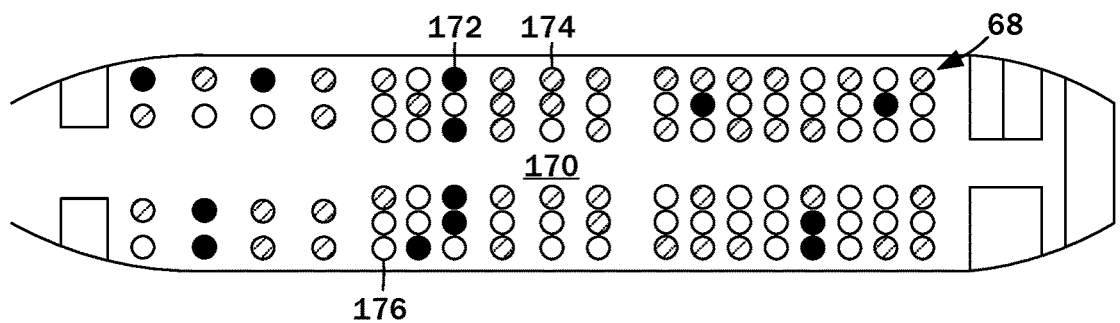
FIG. 7 is an example crew terminal interface showing an overview status of the seat occupancy monitoring application.

FIG. 7 illustrates an example interface that shows a layout 170 of the cabin with each of the passenger seats 68 installed in the aircraft 10. The currently occupied seats 172 may be represented with a solid circle, while a ticketed but as of yet unoccupied seat 174 may be represented as a cross-hatched circle. The seats that are not booked 176 may be shown as a white circle. The specific graphics and layout of the crew terminal interface is presented by way of example only and not of limitation. Any other interface that is capable of showing seat occupancy may be substituted without departing from the scope of the present disclosure. The layout 170 is intended to present to a crewmember a verification of how many passengers have boarded, a verification of the number of passengers boarded and seated, and a verification that all passengers who are boarded are, indeed, seated rather than, for example, using the lavatories or loitering in a common area in the cabin. Furthermore, crewmembers may be alerted when a passenger leaves the seat 68 during a flight phase when prohibited such as landing, take-off, or during high turbulence.

The occupancy information throughout the flight, as well as the measured weight of each of the passengers may be used by the ground-based analytics processor 168 for various flight management purposes. For instance, fuel cost predictions may be more accurate based on precise weight data, analyzed according to destination, season, or any other factor. Balancing of the aircraft may be performed as a consequence of the actual weight data. Furthermore, medical studies of weight change and averages may utilize the captured data. Once provided to the ground-based analytics processor 168, the data may be stored on a seat occupancy database 178.

Figure 8:
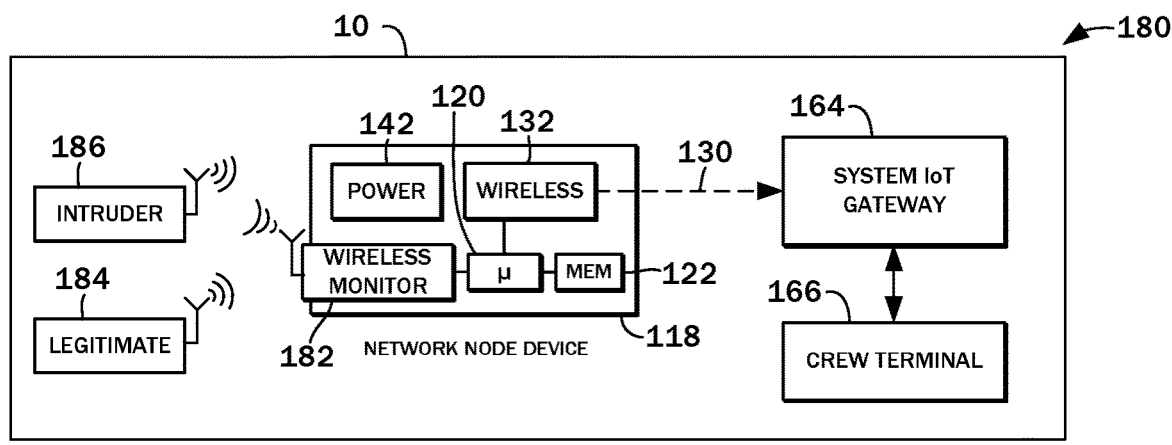
FIG. 8 is a block diagram of an exemplary wireless intrusion detection application that may be implemented with the auxiliary personal area network system.

The block diagram of FIG. 8 illustrates another use of the auxiliary personal area network system 102 as a wireless intrusion detection system 180. The network node device 118 thereof shares many of the same components as the above-described embodiments, including the microcontroller 120, the memory 122, the wireless communications module 132, and the power source 142. Additionally, there is a wireless network monitor 182 that receives all signals originating from within the aircraft 10 and close vicinity thereof, whether that be from a legitimate device 184 or an intruder device 186. The wireless traffic that is monitored may be WiFi/802.11, or IoT interfaces such as Bluetooth, Zigbee, Thread, and so on. The wireless network monitor 182 attempts to detect rogue access points and malicious wireless intruders and includes both a data traffic interface that captures the radio frequency transmissions, as well as an intrusion detector that analyzes the transmissions to determine whether there is a potential security event. There are a variety of malicious actions the intruder device 186 may take, such as impersonating the on-board WiFi access points in an effort to perform a man-in-the-middle attack. In this form of attack, the intruder device 186 attempts to deceive the other PEDs 94 on board to connect to the fake access point, and steal information through hosting false mock-portal pages or capturing data traffic that is not end-to-end encrypted.

To communicate the security events for further handling, the wireless communications module 132 is connected to the system IoT gateway over the auxiliary personal area network 130 and reports the security events to the crew terminal 166. Multiple network node devices 118 may be positioned throughout the aircraft 10, and that those with the strongest signal/connection to the intruder device 186 are assumed to be the closest thereto. Thus, an approximate position of the intruder device 186 may be reported to the crew terminal 166 or any other destination. In the reports of the security event, the relative signal strength values may be included so that proximity may be better assessed via the crew terminal 166.

Figure 9:
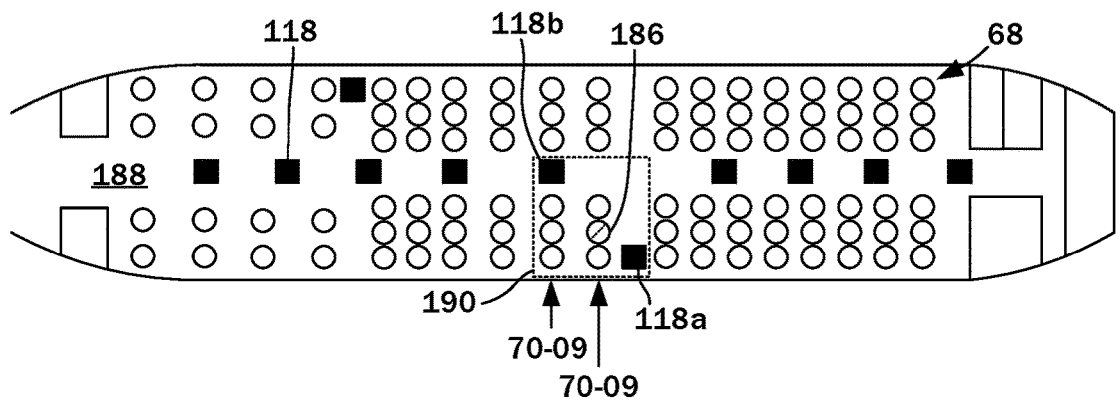
FIG. 9 is an example crew terminal interface showing a potential malicious activity on the aircraft network as indicated by the intrusion detection application.

FIG. 9 is an exemplary interface of the crew terminal 166 with a layout 188 in which each of the circles represents the seats 68 installed in the aircraft 10. Multiple network node devices 118 of the wireless intrusion detection system 180 may be located throughout the cabin. A first network node device 118*a* and a second network node device 118*b* between a ninth row 70-9 and a tenth row 70-10 on the port side of the aircraft have identified region 190 as possibly containing the intruder device 186.

Figure 10:
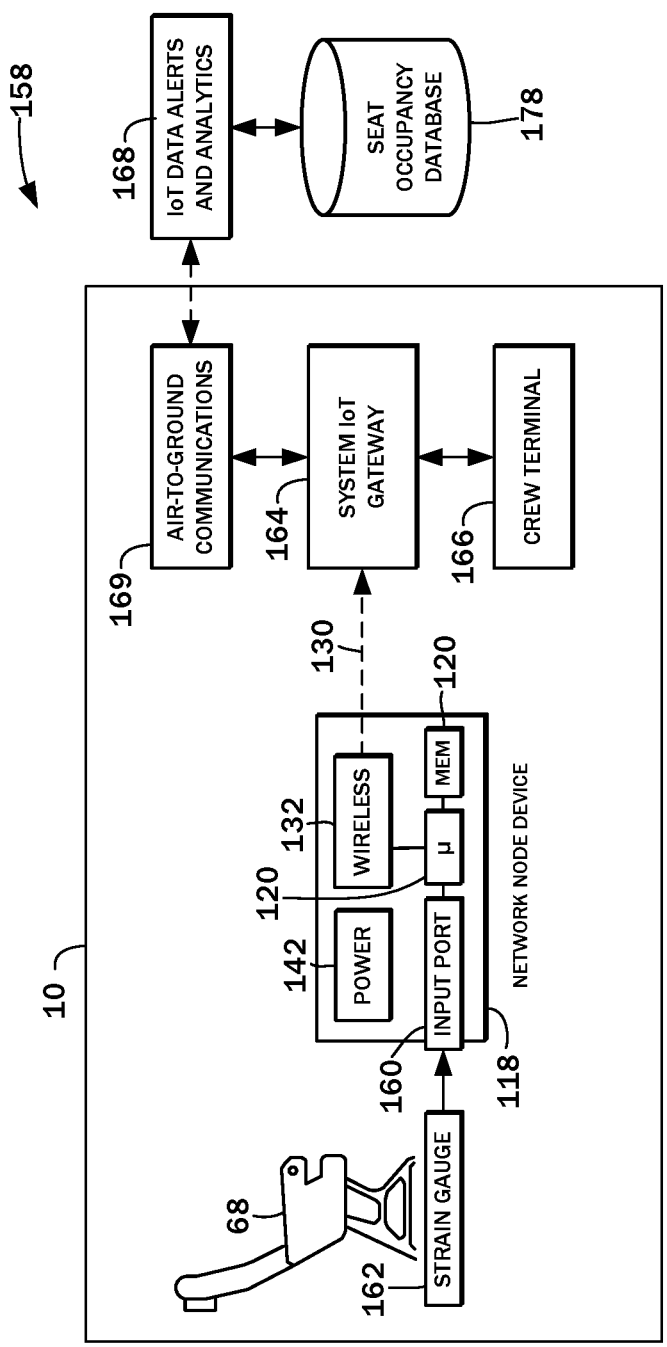
FIG. 10 is a block diagram of an exemplary wired intrusion detection application that may be implemented with the auxiliary personal area network system.

Referring to the block diagram of FIG. 10, yet another use of the auxiliary personal area network system 102 is a wired in-line intrusion detection system 192. The network node device 118 thereof also shares many of the same components as the above-described embodiments, including the microcontroller 120, the memory 122, the wireless communications module 132, and the power source 142. A pass-through Ethernet interface monitors the traffic on the Ethernet network, which may be comprised of a first monitored network device 194*a* and a second monitored network device 194*b*.

Each of these monitored network devices 194 may be connected to further monitored network devices within the same Ethernet network. The incoming data traffic 195*a*-1 from the first monitored network device 194*a* passes through a first external port 196*a* and captured by a first receive interface 198*a*. This data traffic continues to a second external port 196*b* and is output as outgoing data traffic 195*a*-2 that continues to the second monitored network device 194*b*. The incoming data traffic 195*b*-1 from the second monitored network device 194*b* passes through the second external port 196*b* and captured by a second receive interface 198*b*. This data traffic also continues to the first external port 196*a* and is output as outgoing traffic 195*b*-2 that continues to the first monitored network device 194*a*. The first receive interface 198*a* and the second receive interface 198*b* are connected to an Ethernet media access control interface 200. This receive-only configuration is contemplated to conserve the limited power source 142.

The captured data traffic may be analyzed by the microcontroller 120 to determine whether an intruder node is connected to the Ethernet network. The network node device 118 may therefore include an intrusion detector that may be implemented as software instructions that are executed by the microcontroller 120. Certain data traffic may be identified as security threats based upon an evaluation thereof. Those having ordinary skill in the art will recognize the analytics that may be applied to reach a conclusion that the data traffic is indicative of an intruder or a threat.

The wireless communications module 132 transmits the security event on the auxiliary personal area network 130, ultimately reaching the system IoT gateway 164. The security event may then be provided to the crew terminal 166, or to the ground-based analytics processor 168. The air-to-ground communications modality 169 may be used transmit the security event data to the ground-based analytics processor 168. Once provided to the ground-based analytics processor 168, the data may be stored on a database 202.

The particulars shown herein are by way of example and for purposes of illustrative discussion of the embodiments of the auxiliary personal area network system and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. An auxiliary wireless personal area network system installable in an aircraft, comprising:
   a plurality of line replaceable units each associated with an avionics subsystem and installable in prescribed locations in the aircraft, at least a subset of the line replaceable units being interconnectable over a dedicated subsystem network;
   a plurality of network node devices each associated with a respective one of the plurality of line replaceable units, each of the network node devices including a microcontroller, an onboard power source independent of any aircraft power source, a local interface connectible to the respective one of the plurality of line replaceable units, and a wireless network interface connectible to a personal area network independent of the dedicated subsystem network to relay operational data from a line replaceable unit to a corresponding network node device;
   wherein the line replaceable unit includes an external input, a command transmitted to the corresponding network node device over the personal area network being passed to the external input to control the line replaceable unit and
   wherein the command transmitted to the corresponding network node device is to power-down reset of the line replaceable unit connected to the corresponding network node device; or is to reconfigure the line replaceable unit connected to the corresponding network node device.

2. The system of claim 1, wherein at least a subset of the network node devices are connectible to each other over the personal area network in a many-to-many topology.

3. The system of claim 1, further comprising:
   a parent node connectible to the network node devices over the personal area network and being receptive to the operational data from the line replaceable units being relayed over the personal area network.

4. The system of claim 1, wherein the operational data is selected from a group consisting of: aircraft status data, line replaceable unit identification data, line replaceable unit fault status data, and line replaceable unit built-in test equipment data.

5. The system of claim 1, wherein the data traffic from each of the network node devices is encrypted with a pre-shared key.

6. The system of claim 1, wherein the wireless network interface includes a transceiver having an operating frequency band of 800 MHz to 900 MHz.

7. The system of claim 1 wherein at least one of the network node devices include an energy harvester recharging the onboard power source in response to environmental conditions.

8. A wireless personal area network system for a vehicle, comprising:
   a plurality of input devices deployed to prescribed locations in the vehicle and receptive to external inputs;
   a plurality of network node devices each associated with a specific one of the plurality of input devices, each of the network node devices including:
   a microcontroller;
   an input data port connectible to the specific one of the plurality of input devices to retrieve operational data from the specific one of the plurality of input devices;
   a network transceiver connectible to an auxiliary personal area network, the operational data retrieved from the specific one of the plurality of input devices being transmitted to other network node devices connected to the auxiliary personal area network;
   a power source powering at least the microcontroller and the network transceiver independent of power systems of the vehicle; and
   a crew terminal connectible to the auxiliary personal area network to retrieve the operational data from each of the plurality of network node devices, the crew terminal generating a display representative of the occupancy status of each of the passenger seats.

9. The wireless personal area network system of claim 8, wherein:
   the plurality of input devices are strain sensors coupled to passenger seats installed in the vehicle; and
   the operational data is selected from a group consisting of: occupancy status as to a specific one of the passenger seats, weight of an occupant seated in the specific one of the passenger seats, and forces applied to the specific one of the passenger seats during vehicle travel.

10. The wireless personal area network system of claim 8, wherein:
    the plurality of input devices are each human interface devices for a vehicle entertainment system, terminal devices of the vehicle entertainment system being installed for each passenger seat of the vehicle; and
    the operational data is input captured by the human interface devices.

11. The wireless personal area network system of claim 8, wherein the plurality of network node devices each include an energy harvester recharging the power source in response to environmental conditions.

12. An intrusion detection system for in-vehicle data traffic transmissions, the system comprising:
    a data traffic interface receptive to at least one of the in-vehicle data traffic transmissions;
    an intrusion detector connected to the data traffic interface, specific ones of the in-vehicle data traffic transmissions and originating devices of the specific ones of the in-vehicle data traffic transmissions being identified as security threats based upon an evaluation of the in-vehicle data traffic transmissions;
    a network transceiver connectible to an auxiliary personal area network, the in-vehicle traffic transmissions identified as security threats being transmitted as a security event to a gateway device over the auxiliary personal area network; and a power source powering at least the microcontroller and the network transceiver independent of power systems of the vehicle;

wherein the data traffic interface is positioned at a prescribed location within the vehicle, and a position of the originating device identified as a security threat is derived from a signal strength measurement of the in-vehicle data traffic transmission from the prescribed location of the data traffic interface.

13. The intrusion detection system of claim 12, wherein the in-vehicle data traffic transmissions are wireless and the data traffic interface is a radio frequency receiver circuit operating independently of the network transceiver.

14. The intrusion detection system of claim 12, wherein the in-vehicle data traffic transmissions are made over a wired data link and the data traffic interface is a pass-through receive-only interface to the wired data link.

15. The intrusion detection system of claim 12 further comprising:

an energy harvester recharging the power source in response to environmental conditions.

* * * * *